(12) United States Patent
Wang et al.

(10) Patent No.: US 11,746,644 B2
(45) Date of Patent: Sep. 5, 2023

(54) MEASURING LOW-FREQUENCY CASING GUIDED WAVES TO EVALUATE CEMENT BOND CONDITION BEHIND CASING IN THE PRESENCE OF A TUBING

(71) Applicant: Halliburton Energy Services, Inc., Houston, TX (US)

(72) Inventors: Ruijia Wang, Singapore (SG); Yao Ge, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 49 days.

(21) Appl. No.: 17/540,393

(22) Filed: Dec. 2, 2021

(65) Prior Publication Data
US 2023/0175385 A1 Jun. 8, 2023

(51) Int. Cl.
*G01N 29/46* (2006.01)
*E21B 47/005* (2012.01)
*G01N 29/04* (2006.01)

(52) U.S. Cl.
CPC .......... *E21B 47/005* (2020.05); *G01N 29/04* (2013.01); *G01N 29/46* (2013.01); *E21B 2200/20* (2020.05); *G01N 2291/028* (2013.01); *G01N 2291/0232* (2013.01); *G01N 2291/102* (2013.01); *G01N 2291/2636* (2013.01)

(58) Field of Classification Search
CPC ... E21B 47/005; E21B 2200/20; G01N 29/04; G01N 29/46; G01N 2291/0232; G01N 2291/028; G01N 2291/102; G01N 2291/2636
See application file for complete search history.

(56) References Cited

U.S. PATENT DOCUMENTS

| | | | |
|---|---|---|---|
| 10,983,232 B2* | 4/2021 | Ba | G01V 1/306 |
| 2015/0219780 A1 | 8/2015 | Zeroug et al. | |
| 2017/0115413 A1 | 4/2017 | Wang et al. | |
| 2018/0149019 A1 | 5/2018 | Bose et al. | |
| 2019/0018161 A1 | 1/2019 | Wang et al. | |

(Continued)

OTHER PUBLICATIONS

International Search Report and Written Opinion for Application No. PCT/US2021/063144, dated Aug. 17, 2022.

*Primary Examiner* — Suman K Nath
(74) *Attorney, Agent, or Firm* — John Wustenberg; C. Tumey Law Group PLLC

(57) ABSTRACT

A method and system for cement evaluation. The method may include disposing an acoustic logging tool into a pipe string that is disposed in a first casing of a wellbore, transmitting an acoustic wave at a first location within the wellbore from an acoustic source disposed on the acoustic logging tool, and recording one or more acoustic signals with one or more receivers on the acoustic logging tool at the first location. The method may further include performing a multichannel multimode dispersion analysis of the one or more acoustic signals, extracting one or more fluid modes propagating in the first casing from the dispersion analysis, extracting one or more pseudo-lamb waves propagating in the first casing from the dispersion analysis, extracting one or more pseudo-SH-plate waves propagating in the first casing from the dispersion analysis, and identifying a bonding condition between the first casing and a cement.

20 Claims, 8 Drawing Sheets

(56) References Cited

U.S. PATENT DOCUMENTS

| | | |
|---|---|---|
| 2019/0025452 A1 | 1/2019 | Wang et al. |
| 2019/0145241 A1 | 5/2019 | Yao et al. |
| 2019/0204468 A1 | 7/2019 | Ge et al. |
| 2019/0257971 A1 | 8/2019 | Wang et al. |
| 2019/0317238 A1 | 10/2019 | Wang et al. |
| 2019/0376380 A1 | 12/2019 | Zhang et al. |
| 2020/0049850 A1 | 2/2020 | Liu et al. |
| 2020/0341163 A1 | 10/2020 | Wang et al. |
| 2021/0048546 A1 | 2/2021 | Wang et al. |
| 2021/0108510 A1 | 4/2021 | Ge et al. |
| 2021/0141115 A1 | 5/2021 | Wang et al. |
| 2021/0208299 A1 | 7/2021 | Wang et al. |
| 2021/0231008 A1 | 7/2021 | Stark et al. |
| 2021/0231822 A1 | 7/2021 | Wang et al. |
| 2021/0286099 A1 | 9/2021 | Wang et al. |
| 2021/0311222 A1 | 10/2021 | Wang et al. |
| 2021/0325558 A1 | 10/2021 | Wang et al. |
| 2021/0333428 A1 | 10/2021 | Wang et al. |

\* cited by examiner

MEASURING LOW-FREQUENCY CASING GUIDED WAVES TO EVALUATE CEMENT BOND CONDITION BEHIND CASING IN THE PRESENCE OF A TUBING

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

From time to time, a review of the condition of the well installation. For example, bonding between a casing and the cement that holds it in place to the subterranean formation is of particular importance. Generally, operations are performed when a pipe string is not present in the casing. However, well installations may comprise a pipe string that may separate a logging tool from the casing. These operations are identified as through tubing cement evaluation (TTCE). TTCE is challenging as most of the sonic signals are limited in the steel of the pipe string. Traditional methods using 20 kHz acoustic signals or ultrasonic signals encounter issues for TTCE, as the signals propagating in the pipe string dominate the waveform train, and the casing-related signals are weak compared to signals from the pipe string. Thought tubing cement evaluation is challenging as the pipe string blocks most of the acoustic signals, especially at high frequencies. Traditional methods may encounter serious signal to noise ratio issues when logging in a well with the presence of the pipe string.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to methods and system for through tubing cement evaluation using multi-firing multimode array processing. As discussed below, an acoustic logging toll with an ability to fire (i.e., transmit) monopole, dipole, and unipole acoustic waves disposed into a wellbore to identify a bonding condition between casing and cement. Monopole, dipole, and unipole acoustic signals are recorded by an array of receivers. Then, a multimode dispersion analysis method is used to extract dispersions of different wave motions. Casing-related modes are identified and used to calculate the bond condition behind the casing.

Casing-related modes comprise the fluid modes formed by the reflected signals in the fluid-filled space inside the casing, the pseudo-Lamb waves, and the SH waves in the solid casing layer. Theoretical studies demonstrate that the slowness and attenuation of casing fluid modes, casing pseudo-Lamb modes, and the SH waves are sensitive to the bonding condition behind the casing. Array processing is used to separate and identify all the casing-related modes from the tubing-related waves. Then attenuation and slowness of these modes are extracted. Finally, the bonding index is calculated from either the dispersion or the attenuation or both of these modes.

Figure 1:
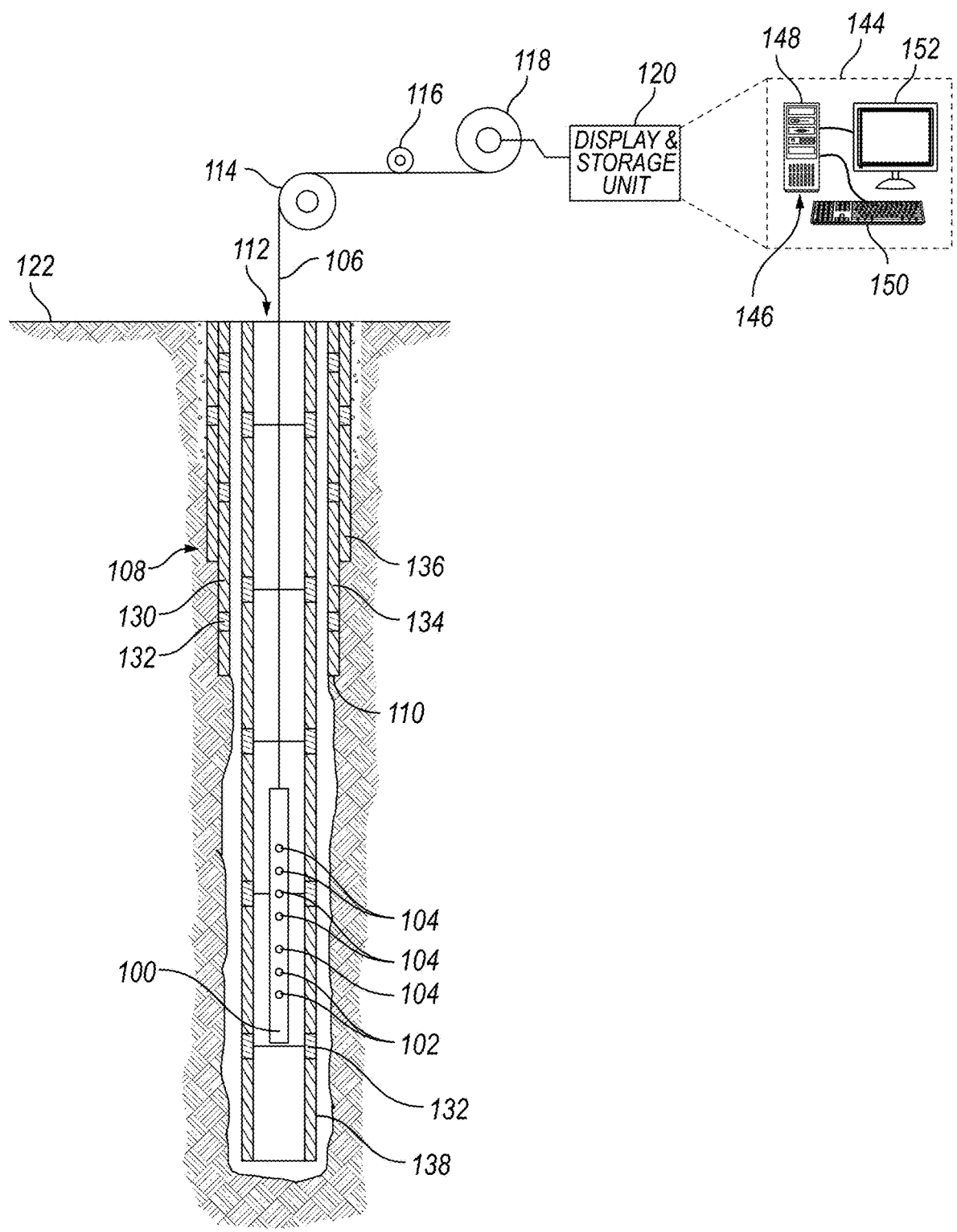
FIG. 1 illustrates a system including an acoustic logging tool.

FIG. 1 illustrates an operating environment for an acoustic logging tool 100 as disclosed herein in accordance with particular embodiments. Acoustic logging tool 100 may comprise one or more transmitters 102 and/or one or more receivers 104. As illustrated, one or more receiver 104 may be positioned on the acoustic logging tool 100 at selected distances (e.g., axial spacing) away from transmitter 102. The axial spacing of receiver 104 from transmitter 102 may vary, for example, from about 0 inches (0 cm) to about 40 inches (101.6 cm) or more. In some embodiments, at least one receiver 104 may be placed near the transmitter 102 (e.g., within at least 1 inch (2.5 cm)) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may comprise more than one transmitter 102 and more than one receiver 104. For example, an array of receivers 104 may be used. Transmitters 102 may comprise any suitable acoustic source for generating acoustic waves downhole, including, but not limited to, monopole and multipole sources (e.g., dipole, cross-dipole, quadrupole, hexapole, or higher order multi-pole transmitters). Specific examples of suitable transmitters 102 may comprise, but are not limited to, piezoelectric elements, bender bars, transducers, or other transducers suitable for generating acoustic waves downhole. Receiver 104 may comprise any suitable acoustic receiver suitable for use downhole, including piezoelectric elements that may convert acoustic waves into an electric signal.

Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may comprise one or more electrical conductors, may exit wellhead 112, may pass around pulley 114, may engage odometer 116, and may be reeled onto winch 118, which may be employed to raise and lower the tool assembly in wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging.

As illustrated, one or more receivers 104 may be positioned on the acoustic logging tool 100. It should be understood that the configuration of acoustic logging tool 100 shown on FIG. 1 is merely illustrative and other configurations of acoustic logging tool 100 may be used with the present techniques. Receiver 104 may comprise any suitable acoustic receiver suitable for use downhole, including piezoelectric elements that may convert acoustic waves into an electric signal or hydrophones.

Figure 2A:
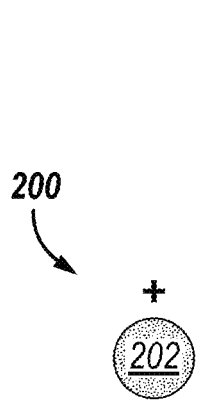
FIGS. 2A-2F illustrate different types of transmitters and/or receivers.

FIG. 2A-2F illustrate sketch maps of configurations of point sources that may be utilized for transmission of acoustic energy and receiving acoustic energy by a transmitter 102 or receiver 104, respectfully. For example, FIG. 2A is a sketch map for an ideal monopole 200, which may be referred to as a monopole mode, formed from a single positive phase point source 202. This allows for monopole 200 to be omni-directional.

Figure 2B:
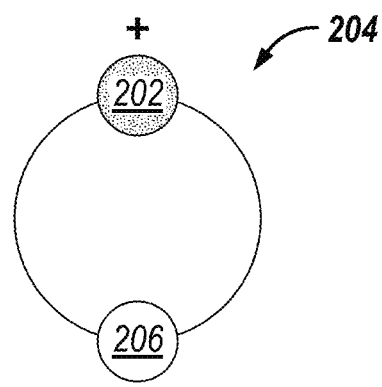

FIG. 2B illustrates a sketch map of a dipole 204, which may be referred to as a dipole mode. A dipole 204 may be represented by two-point sources with opposite phase, a positive phase point sources 202 and a negative phase point sources 206.

Figure 2C:
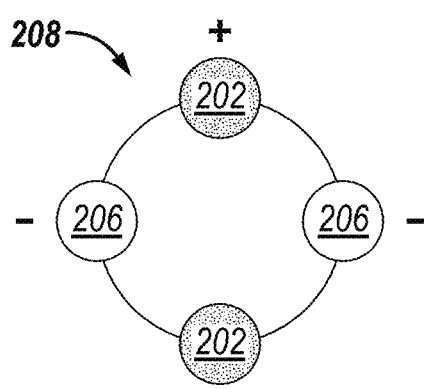

A quadrupole 208, as illustrated in FIG. 2C, may be represented by four-point sources with different phases, two positive phase point sources 202 and two negative phase point sources 206. Quadrupole 208 may be referred to as a quadrupole mode.

Figure 2D:
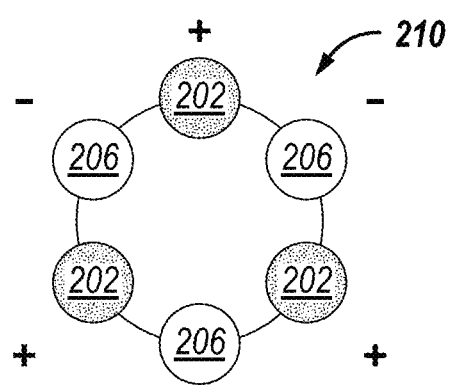

A hexapole 210, as illustrated in FIG. 2D, may be represented by six-point sources with different phases, three positive phase point sources 202 and three negative phase point sources 206. Hexapole 210 may be referred to as a hexapole mode.

Figure 2E:
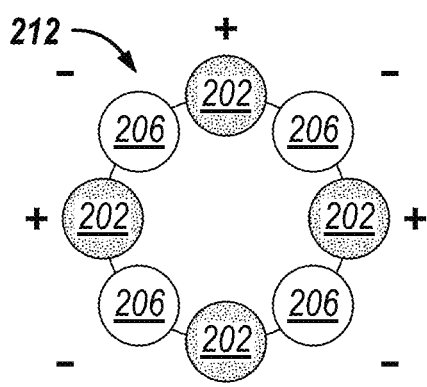

An octupole 212, as illustrated in FIG. 2E, may be represented by eight-point sources with different phases, four positive phase point sources 202 and four negative phase sources receivers 206. Octupole 212 may be referred to as an octupole mode.

Figure 2F:
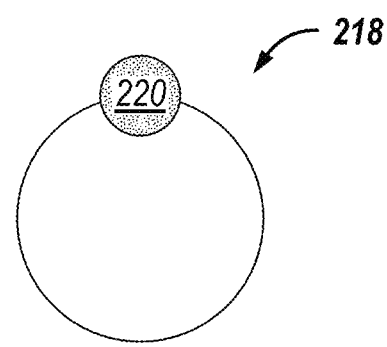

An unipole 218, as illustrated in FIG. 2F, may be represented by a single eccentric point source 220. As discussed below, a field generated by unipole 218 may comprise all type of borehole modes, including monopole mode, dipole mode, quadrupole mode, hexapole mode, octupole mode and other high-pole modes.

Figure 3:
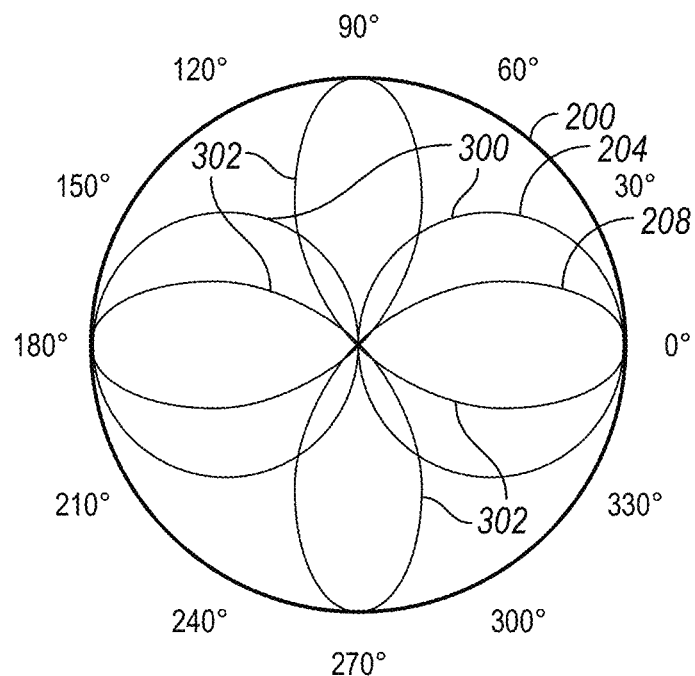
FIG. 3 is a graph of different types of radiation and/or reception pattern.
Figure 4:
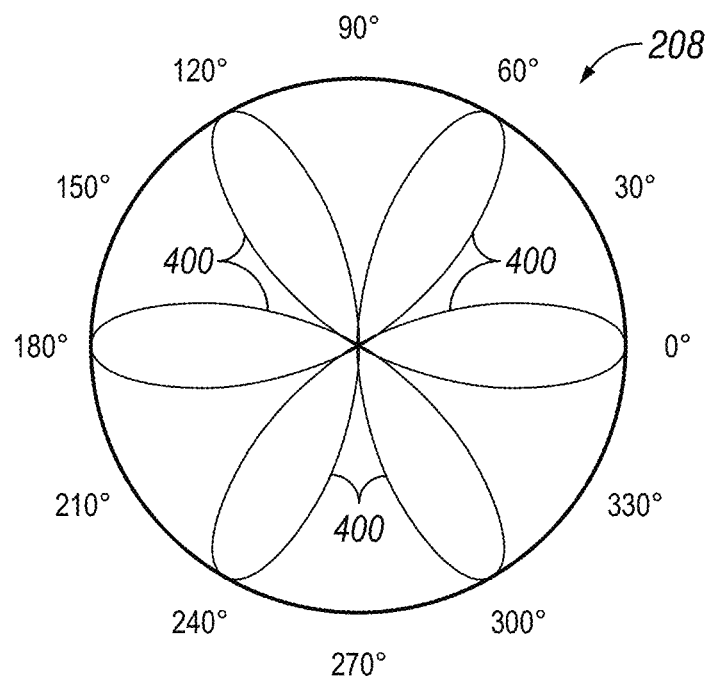
FIG. 4 is a graph of a hexapole radiation and/or reception pattern.
Figure 5:
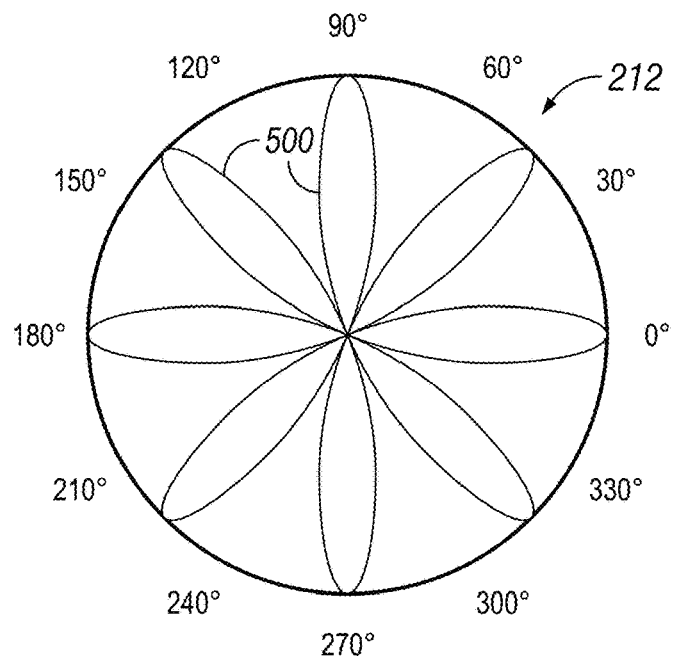
FIG. 5 is a graph of an octupole radiation and/or reception pattern.

FIG. 3 illustrates a theoretical radiation/receiving pattern of wave fields for, specifically, an ideal monopole 200, an ideal dipole 204, and an ideal quadrupole 208. Dipole 204 may produce a theoretical radiation/receiving pattern shows a shape of the number '8' which comprises two lobes 300. Quadrupole 308 radiation/receiving pattern shows a shape of 'quatrefoil' which comprises four lobes 302. FIG. 4 illustrates a theoretical radiation/receiving pattern of wave fields for an ideal hexapole 208 with six lobes 400. FIG. 5 illustrates a theoretical radiation/receiving pattern of wave fields for octupole 212 with eight lobes 500. It should be noted that the term "higher-pole" mode is defined as a mode that comprises more lobes than the previously identified mode. For example, quadrupole 308 is a "higher-order" than dipole 204 as quadrupole 308 comprise more lobes than dipole 204.

Referring back to FIG. 1, the recordation of signals (i.e., radiation/receiving pattern of wave fields) by receivers 104 may be controlled by display and storage unit 120, which may comprise an information handling system 144. As illustrated, the information handling system 144 may be a component of the display and storage unit 120. Alternatively, the information handling system 144 may be a component of acoustic logging tool 100. An information handling system 144 may comprise any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may comprise a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may comprise any instrumentality or aggregation of instrumentalities that may retain data and/or instructions for a period of time. Non-transitory computer readable media 148 may comprise, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also comprise input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

Figure 6:
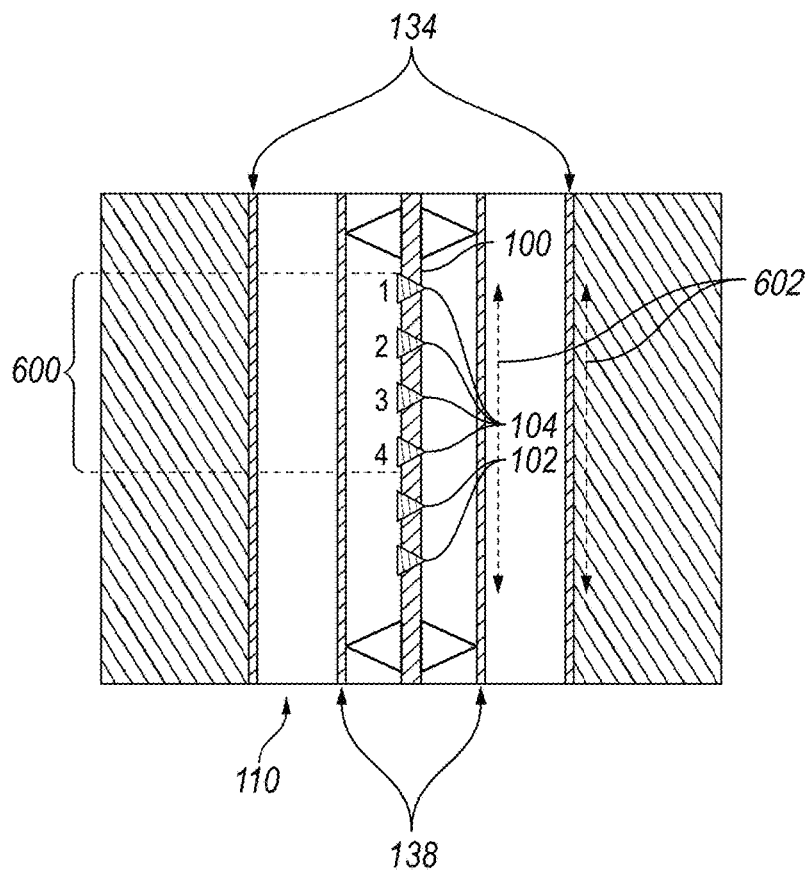
FIG. 6 illustrates an acoustic logging tool during measurement operations.

FIG. 6 illustrates acoustic logging tool 100 during a measurement operation. As illustrate, acoustic logging tool 100 may comprise receiver array 600 and at least one transmitter 102. Without limitation, there may be one receiver 104 or any number of receivers 104. As illustrated, receiver array 600 comprises a plurality of the receivers 104 arranged longitudinally along the acoustic logging tool 100. As illustrated in FIG. 6, during measurement operations acoustic logging tool 100 may be disposed in pipe string 138, which may be disposed in a first casing 134. It should be noted that both pipe string 138 and first casing 134 both may contain and may be emersed in any time of downhole fluid. During operations, each receiver 104 of receiver array 600 may sense and record any number of acoustic signals and/or vibrations continuously as acoustic logging tool 100 moves up or down wellbore 110 within pipe string 138. The recorded acoustic signals and/or vibrations may be identified as acoustic data. The acoustic data may be transmitted to information handling system 144, which may process each recorded acoustic signal.

During measurement operations, acoustic signals recorded by one or more receivers 104 may comprise guided-wave signal 602. A guided wave signal 602 is defined as wave motions propagating along pipe string 138 or first casing 134. In examples, guided-wave signals 602 may propagate up or down any casing. Recording and processing guided-wave signals 602 may allow for through tubing cement evaluation (TTCE). TTCE is a multi-step process in which acoustic signals are recorded during measurement operations and processing techniques are applied to the acoustic signals to determine if cement has bonded to an identified casing and/or subterranean formation 604. TTCE is challenging as most of the acoustic signals are limited in pipe string 138, and thus evaluating bonding on outer casing may be difficult. Traditional methods may use 20 kHz acoustic signals or ultrasonic signals, which creates many issues for TTCE. For example, the 20 kHz acoustic signals or ultrasonic signals in pipe string 138 may mask (i.e., dominate, hide, cover, washout) other waveforms in first casing 134 as the 20 kHz acoustic signals or ultrasonic signals mostly propagate in pipe string 138. Specifically, acoustic signals that may be propagating in first casing 134 may be masked by acoustic signals propagating in pipe string 138. The masking may happen as the acoustic signals propagating in first casing 134 may be weaker (i.e., have a lower amplitude) compared to acoustic signals in pipe string 138. However, methods and systems described below may be utilized to identify waveforms on both pipe string 138 and first casing 134 and remove masking effects. By identifying the correct wave motions for both pipe string 138 and first casing 134 the bonding between cement in first casing 134 and subterranean formation 604 may be identified. Identifying bonding between cement and first casing 134 and subterranean formation 604 is found using measured acoustic signals propagating within first casing 134.

Methods and systems to reduce masking and separate waveforms from pipe string 138 and first casing 134 may be performed by acoustic modeling. The acoustic model may take into account a fluid-filled pipe and three groups of guided waves. One group of guided waves may comprise the modes propagating inside the internal fluid layer and created by the reflections of fluid P-waves at the internal interface of pipe string 138. The second group of guided waves may comprise pseudo-Lamb waves in pips string 138. A third group may comprise pseudo-shear horizontal (SH)-plate waves in pipe string 138 excited by dipole or high-pole sources. These guided waves may be represented graphically in the Figures below.

Figure 7:
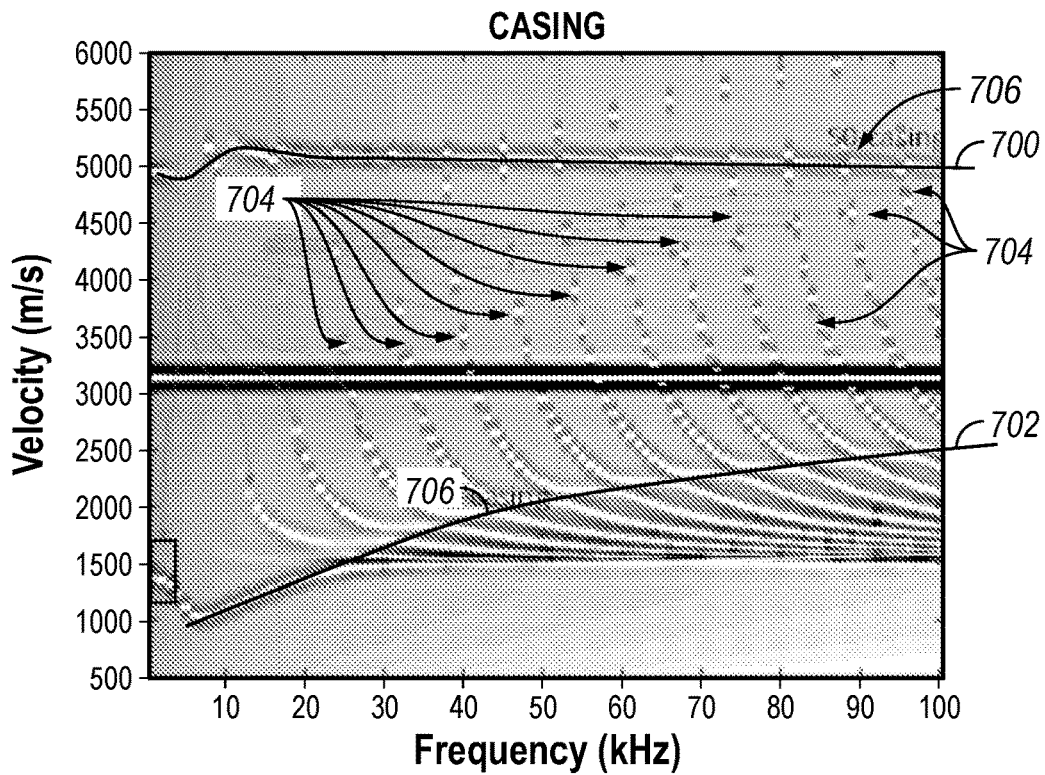
FIG. 7 is a graph of a monopole fluid modes and pseudo-Lamb waves in casing.

FIG. 7 is a graph that shows modelling of monopole dispersion calculations using synthetic data of acoustic waves formed from a monopole transmission by transmitter 102 in first casing 134, which contains downhole fluids (e.g., referring to FIGS. 1 and 6). As illustrated, FIG. 7 illustrates pseudo-Lamb waves for S0-casing 700 and A0-casing 702 and fluid modes 704 (Stoneley and high-order modes). For this disclosure, S0 is the 0st order of symmetric pseudo-lamb waves and A0-the 0at order of antisymmetric pseudo-lamb waves. As illustrated, both fluid modes 704 and the pseudo-Lamb waves may be sensitive to material behind first casing 134, while the pseudo-Lamb waves may be more sensitive to bonding conditions than fluid modes 704. In addition, as shown in FIG. 7, fluid modes 704 and the pseudo-Lamb waves may be coupled at 706 when they cross over with each other. In this case, coupled is defined as an effect that the pseudo-lamb waves and the fluid modes 704 may have on each other. In this instance, the coupling at 706 is removed and two new waves are formed. The two new waves comprise characteristics of both the pseudo-lamb waves and the fluid modes 704 as the two new waves continued to propagate past the point at 706 in which coupling took place.

Figure 8:
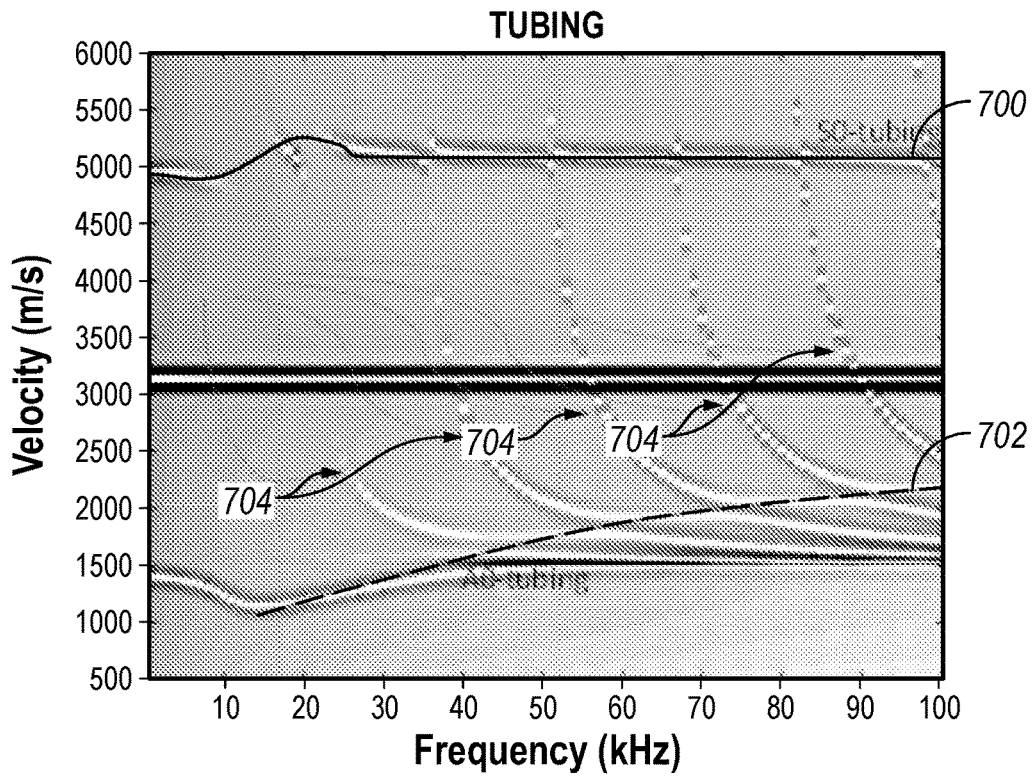
FIG. 8 is a graph of a monopole fluid modes and pseudo-Lamb waves in a pipe string.

FIG. 8 is a graph that shows a monopole dispersion map using synthetic data for a typical fluid-filled pipe string 138. Both fluid modes 704 and pseudo-Lamb waves for S0-casing 700 and A0-casing 702 are illustrated. The tubing dispersion map in FIG. 8 shows fewer fluid modes 704 than that seen in FIG. 7 of acoustic waves formed from a monopole transmission in first casing 134. The tubing fluid modes 704 may be shifted to high frequencies as internal tubing diameter is usually much smaller than the internal diameter of first casing 134. For example, the internal tubing diameter may range from about 1 inch to about 4.5 inches (about 2.4 cm to about 11.5 cm) and the internal diameter of first casing 134 may be about 4 inches to about 14 inches (about 10 cm to about 35.5 cm). As shown in FIG. 7, below 20 kHz, there may be fewer tubing waves than at high frequencies. Also, the low-frequency signals often have the solid penetrating capability, thus, low-frequency firing from transmitter 102 may be beneficial.

FIGS. 7 and 8 show the dispersion maps by a monopole source, where fluid modes 704 and lamb waves for S0-casing 500 and A0-casing 702 are created by the 'P-SV' modal conversion system at the fluid-solid interface. The 'P-SV' modal conversion system is created from fluid P-waves, which may create both P and Shear Vertical (SV) waves in a solid layer (such as pipe string 138 and/or first casing 134) when the P-waves interact with the solid layer at the fluid-solid interface. This interaction is defined as the P-SV conversion system. Additionally, SH waves cannot be directly generated from a P-wave. The interference between P-waves and SV waves in a solid layer may create lamb waves, including A0 and S0 waves. With continued reference to FIGS. 7 and 8, if a high-pole source is transmitted from transmitter 102, such as a dipole source or a quadrupole source, then a fluid P-wave with a gradient in the azimuthal direction may generate pseudo-SH-plate waves in first casing 134. The pseudo-SH-plate waves may be susceptible to the interface between first casing 134 and cement. If it is a fluid-solid interface, the pseudo-SH-plate waves may be fully reflected. Otherwise, the pseudo-SH-plate waves may show strong attenuation. The pseudo-SH-plate waves may be excited by dipole, quadrupole, and other high-pole sources.

Figure 9A:
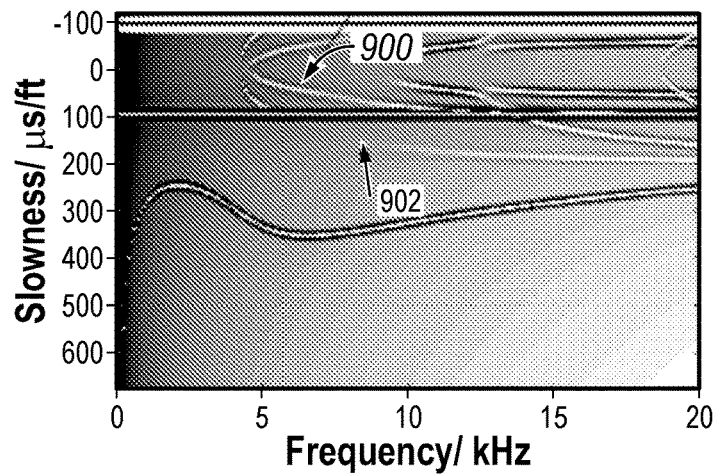
FIG. 9A is a graph of guided waves from a monopole firing.
Figure 9B:
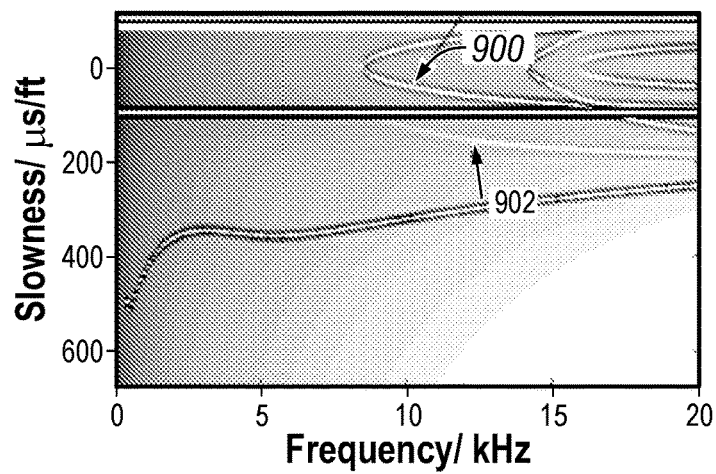
FIG. 9B is a graph of guided waves from a quadrupole firing.
Figure 9C:
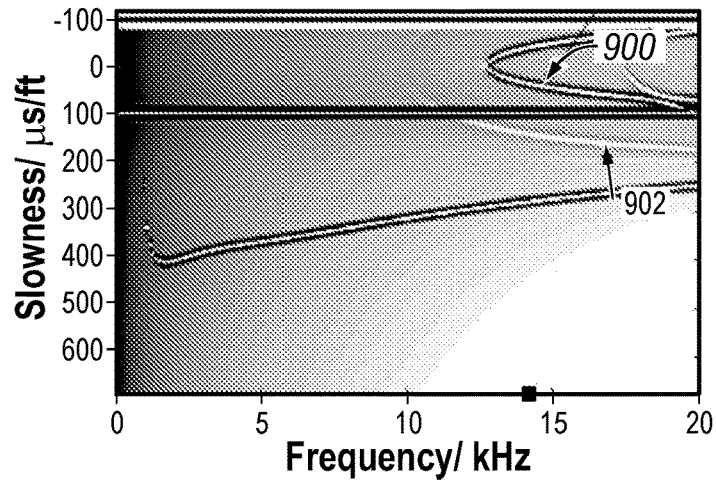
FIG. 9C is a graph of guided waves from a hexapole firing.

For example, FIG. 9A-C are dispersion maps of a fluid-filled first casing 134 by a dipole (i.e., FIG. 9A), quadrupole (i.e., FIG. 9B), and hexapole (i.e., FIG. 9C) using synthetic data. Pseudo-SH-plate waves 900 are observed, and illustrated, in all transmissions from transmitter 102 as shown in FIGS. 9A-C. Additionally, a P-wave 902 is also illustrated in FIGS. 9A-9C. P-wave 902 is just similar to the fluid-mode in FIG. 7. However, P-wave 902 is generated by a high-pole source and the fluid-mode in FIG. 7 is generated by a monopole source. As illustrates, high-pole pseudo-SH-plate waves 900 may have a cutoff frequency corresponding to the resonance frequency of the normal incidence, at which the SH slowness approaches zeros. SH guided wave slowness approaches shear wave slowness of the pipe material at high frequencies. Pseudo-SH-plate waves 900 excited by a high-pole source tend to have a higher cutoff frequency than a low-pole source. Additionally, SH wave cutoff frequency in pipe string 138 may be higher than that of first casing 134.

As noted above, three groups of waves may be sensitive to casing bonding conditions and may be observed in multipole acoustic data. The waves may be fluid modes 504 in first casing 134, pseudo-Lamb waves for S0-casing 500 and A0-casing 502, and pseudo-SH-plate waves 900 in first casing 134. Extracting and interpreting the propagating properties of these modes yields bonding information of the material behind the casing. For examples, if there is little attenuation (i.e., less than 0.5 dB/ft) in S0 waves with little attenuation, fluid modes with little attenuation, and/or pseudo-SH-plate waves with little attenuation, then the acoustic signals may be limited inside first casing 134 and very little bonding has occurred between first casing 134 and subterranean formation 604 (e.g., referring to FIG. 6). Additionally, if there is attenuation in S0 waves with strong attenuation (i.e., above 0.5 dB/ft), fluid modes with strong attenuation, and/or pseudo-SH-plate waves with strong attenuation, then the acoustic signals may be traversing through first casing 134 and into subterranean formation 604. This indicates that bonding has occurred between first casing 134 and subterranean formation 604.

Figure 10:
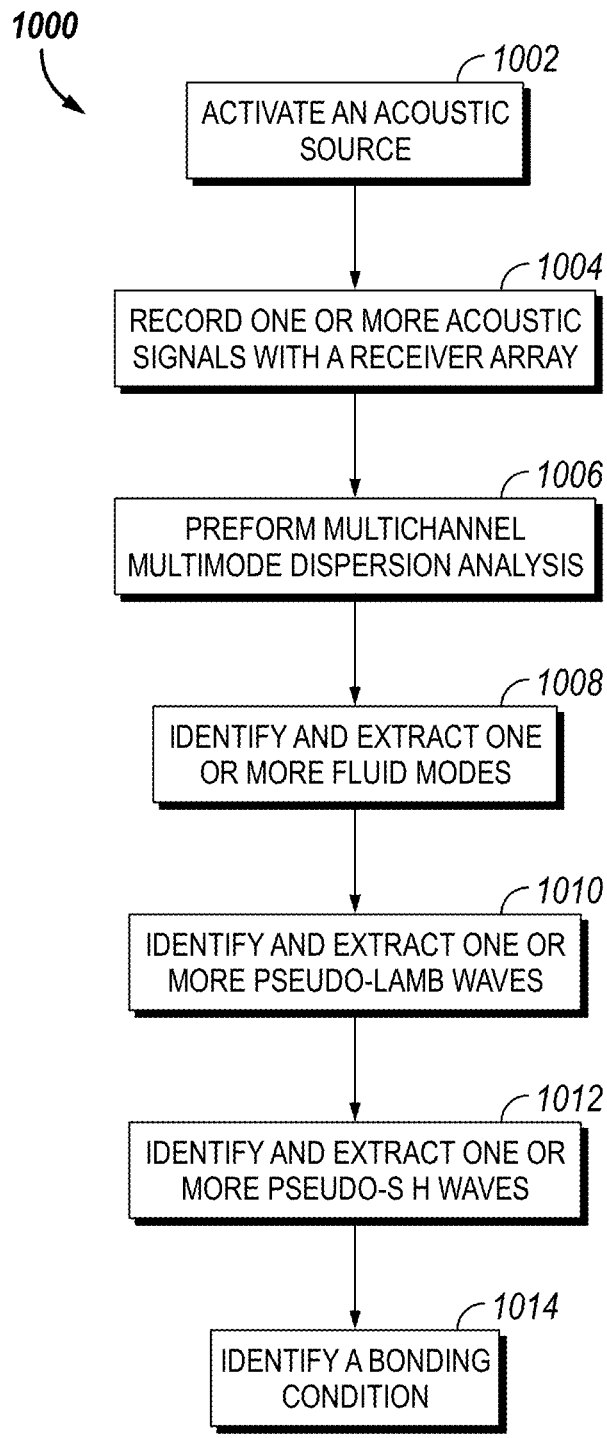
FIG. 10 is a workflow for through tubing cement evaluation.

FIG. 10 illustrates a workflow 1000 for through tubing cement evaluation (TTCE). TTCE identifies a bonding condition between first casing 134 and cement. Workflow 1000 may begin with block 1002. In block 1002, acoustic logging tool 100 may fire one or more types of acoustic sources from one or more transmitters 102 (e.g., referring to FIG. 1). Firing of transmitters 102 may be performed in any order, sequentially, randomly, and/or simultaneously. Acoustic source types for transmitters 102 may comprise, but is not limited to, monopole, dipole, quadrupole, and/or unipole firings. After firing of transmitters 102 in block 1002, one or more acoustic signals may be recorded by an array of receivers 104 in block 1004. In examples, receivers 104 may have short transmitter to receiver axial offsets, which may allow for the capture of leaky modes. Leaky modes represent guided waves that may leak signals into the surrounding media when propagating. Leaky modes may attenuate heavily, thus, receivers 104 with short axial offsets (i.e., about 0 to 3 feet; about 0 to 100 cm) may capture leaky waves than receivers 104 with larger axial offsets (i.e., greater than 3 feet; greater than 100 cm). Recorded signals may be processed in block 1006. In block 1006, a multichannel multi-mode dispersion analysis (Matrix Pencil, Prony, or Modified Differential Phase Frequency Semblance (DPFS), and/or dispersion analyses methods) may be performed to extract all dispersion from the recorded signals. Processing may be performed on information handling system 144 (e.g., referring to FIG. 1). Additionally, after the dispersion analysis in block 1006, one or more fluid modes, for first casing 134 (e.g., referring to FIG. 1) may be identified and extracted in block 1008 from the dispersion using information handling system 144 (e.g., referring to FIG. 1). In block 1010, one or more pseudo-Lamb waves, for first casing 134, may be identified and extracted in block 1010 from the dispersion using information handling system 144 (e.g., referring to FIG. 1). Likewise, one or more pseudo-SH waves 900 (e.g., referring to FIG. 9), for first casing 134, may be identified and extracted in block 1012 from the dispersion using a dispersion analysis on information handling system 144 (e.g., referring to FIG. 1). A dispersion analysis yields a plurality of estimates of one or more dispersion curves and attenuation within each of the one or more dispersion curves. Additionally, each of the extracted dispersion curves may be compared with a target theoretical dispersion curves (for example, pseudo-SH waves). If there is consistency, the dispersion curves may be identified as a target measurements. From blocks 1006-1012, a bonding condition is found in block 1014 by minimizing the differences of the propagating properties of all modes between modeling and the measurements. To perform the minimization in block 1014, a database of different modes with different bonding index values is utilized. The database may be formed using forward modeling before workflow and/or during workflow 1000. Utilizing the database, a search is performed to match a bonding index value with the condition that is found from the differences between the model and the measurements during a minimization procedure.

Figure 11:
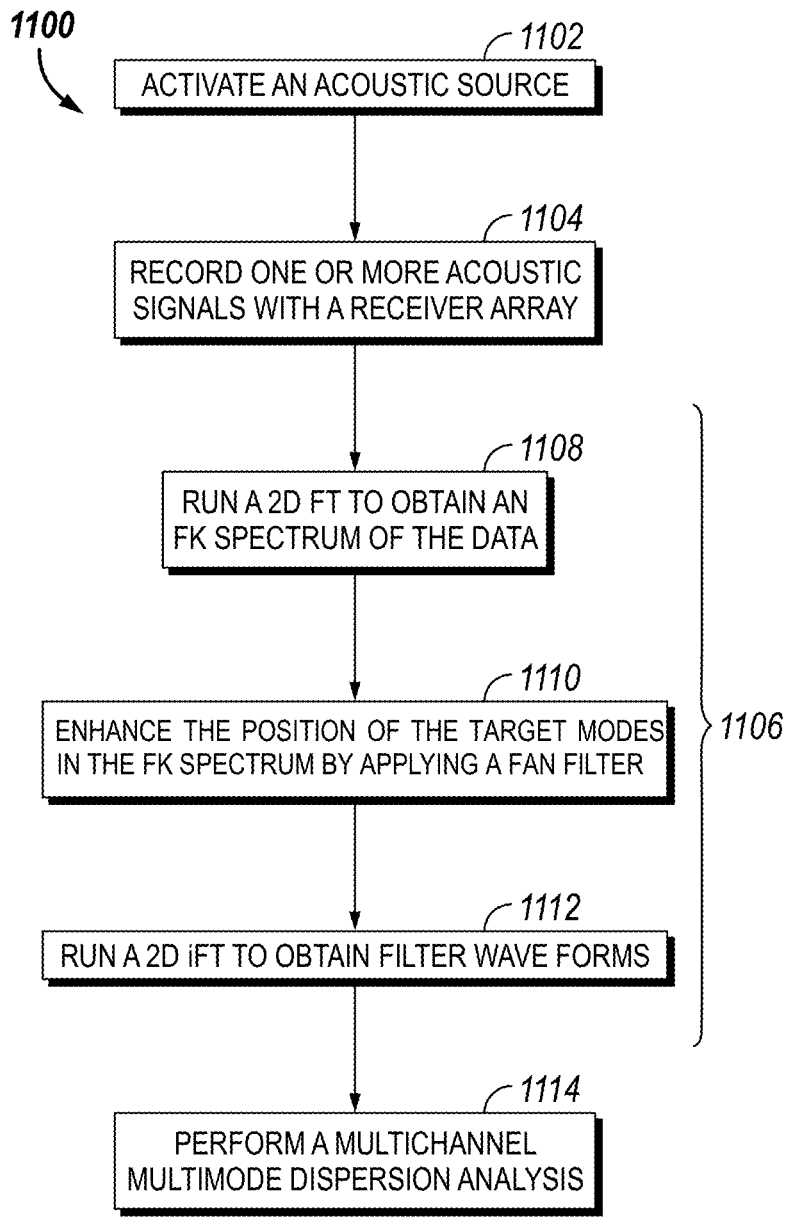
FIG. 11 is another workflow for through tubing cement evaluation.

FIG. 11 illustrates workflow 1100 is another example of a workflow for through tubing cement evaluation (TTCE). In this case, TTCE may be utilized for identifying a bonding condition between first casing 134 and cement with a target acoustic wave. Workflow 1100 may begin with block 1102. In block 1102, acoustic logging tool 100 may fire one or more types of acoustic sources from one or more transmitters 102 (e.g., referring to FIG. 1). Firing of transmitters 102 may be performed in any order, sequentially, randomly, ad/or at the same time. Acoustic source types for transmitters 102 may comprise, but is not limited to, monopole, dipole, quadrupole, and/or unipole firings. After firing of transmitters 102 in block 1002, one or more acoustic signals may be recorded by an array of receivers 104 in block 1104. In examples, receivers 104 may have short transmitter to receiver offsets, which may allow for the capture of leaky modes. During processing in workflow 1100 a slowness range for a target mode may be known. Thus, in block 1106 a target acoustic wave may be selected. To select a target acoustic wave in block 1106 a frequency-wavenumber (FK) filter may be utilized to enhance a signal to noise (SNR) of one or more target acoustic waves before running the multimode dispersion analysis. This may allow workflow 1100 to customize SNR to one or more target acoustic waves, such as, one or more fluid modes 704, pseudo-Lamb waves for S0-casing 700 and A0-casing 702, and pseudo-SH-plate waves 900 (e.g., referring to FIGS. 5, 7, and 9). Selecting and locating a target acoustic wave in block 1106 may comprise blocks 1108-1112 and may be performed on information handling system 144 (e.g., referring to FIG. 1). For example, block 1108 may process the recording taken in block 1104 by running a 2D Fourier Transform to obtain an FK spectrum of data. In block 1110, a fan filter may be applied to the FK spectrum to enhance a portion of the spectrum data for the target acoustic wave. In block 1112, a 2D inverse Fourier Transform is run on the enhanced FK spectrum data to obtain filter waveforms on the target acoustic wave. In block 1114, a multichannel multimode dispersion analysis (Matrix Pencil, Prony, or Modified DPFS) may be performed to extract all dispersion from the recorded signals. Processing may be performed on information handling system 144 (e.g., referring to FIG. 1). Although not illustrated, after block 1114, the steps in blocks 1008-1014, discussed above, may be performed.

Improvements over current prior art may be found in using one or more firings from one or more transmitters to reduce uncertainty and enhance the reliability of bonding index estimates. Additionally, the one or more firing may comprise one or more acoustic wave modes. The systems and methods may comprise any of the various features disclosed herein, including one or more of the following statements.

Statement 1: A method for cement evaluation may comprise disposing an acoustic logging tool into a pipe string that is disposed in a first casing of a wellbore, transmitting an acoustic wave at a first location within the wellbore from an acoustic source disposed on the acoustic logging tool, and recording one or more acoustic signals with one or more receivers on the acoustic logging tool at the first location. The method may further comprise performing a multichannel multimode dispersion analysis of the one or more acoustic signals, extracting one or more fluid modes propagating in the first casing from the dispersion analysis, extracting one or more pseudo-lamb waves propagating in the first casing from the dispersion analysis, extracting one or more pseudo-SH-plate waves propagating in the first casing from the dispersion analysis, and identifying a bonding condition between the first casing and a cement using the one or more fluid modes; the one or more pseudo-lamb waves, or the one or more pseudo-SH-plate waves.

Statement 2. The method of statement 1, wherein the acoustic source is a monopole.

Statement 3. The method of any previous statement, wherein the acoustic source is a dipole.

Statement 4. The method of any previous statement, wherein the acoustic source is a unipole.

Statement 5. The method of any previous statement, wherein the dispersion analysis is a matrix pencil, a prony, or a modified differential phase frequency semblance.

Statement 6. The method of any previous statement, wherein the bonding condition is identified by minimizing between a model and the one or more fluid modes, the one or more pseudo-lamb waves, or the one or more pseudo-SH-plate waves.

Statement 7. The method of any previous statement, wherein each of the one or more receivers are offset in relation to the acoustic source.

Statement 8. The method of any previous statement, wherein the acoustic logging tool further comprises one or more acoustic sources.

Statement 9. The method of statement 8, further comprising transmitting one or more acoustic waves from the one or more acoustic sources sequentially, randomly, or simultaneously.

Statement 10. The method of any previous statements 1-8, further comprising identifying a coupling between the one or more pseudo-lamb waves and the one or more fluid modes.

Statement 11. A method for cement evaluation may comprise disposing an acoustic logging tool into a pipe string that is disposed in a first casing of a wellbore, transmitting an acoustic wave at a first location within the wellbore from an acoustic source disposed on the acoustic logging tool, recording one or more acoustic signals with one or more receivers on the acoustic logging tool at the first location, identifying a target acoustic wave from the one or more acoustic signals, performing a multichannel multimode dispersion analysis of the one or more acoustic signals, extracting the target acoustic wave from the dispersion analysis, and identifying a bonding condition between the first casing and a cement using the target acoustic wave.

Statement 12. The method of statement 11, wherein identifying the target acoustic wave further comprises running a 2D Fourier transform to obtain a frequency-wavenumber spectrum.

Statement 13. The method of statement 12, wherein identifying the target acoustic wave further comprises enhancing the target acoustic wave in the frequency-wavenumber spectrum by applying a fan filter.

Statement 14. The method of statement 13, wherein identifying the target acoustic wave further comprises running a 2D inverse Fourier transform to obtain forms of the target acoustic wave.

Statement 15. The method of any previous statements 11 or 12, wherein the acoustic source is a monopole.

Statement 16, The method of any previous statements 11, 12, or 15, wherein the acoustic source is a dipole.

Statement 17. The method of any previous statements 11, 12, 15, or 16, wherein the acoustic source is a unipole.

Statement 18. The method of any previous statements 11, 12, or 15-17, wherein the target acoustic wave is one or more fluid modes, one or more pseudo-lamb waves, or one or more pseudo-SH-plate waves.

Statement 19. The method of any previous statements 11, 12, or 15-18, wherein the dispersion analysis is a matrix pencil, a prony, or a modified differential phase frequency semblance.

Statement 20. The method of any previous statements 11, 12, or 15-19, wherein the bonding condition is identified by minimizing between a model and one or more fluid modes, one or more pseudo-lamb waves, or one or more pseudo-SH-plate waves.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any comprised range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for cement evaluation, comprising:
    disposing an acoustic logging tool into a pipe string that is disposed in a first casing of a wellbore;
    transmitting an acoustic wave at a first location within the wellbore from an acoustic source disposed on the acoustic logging tool;
    recording one or more acoustic signals with one or more receivers on the acoustic logging tool at the first location;
    performing a multichannel multimode dispersion analysis of the one or more acoustic signals;
    extracting one or more fluid modes propagating in the first casing from the dispersion analysis;
    extracting one or more pseudo-lamb waves propagating in the first casing from the dispersion analysis;
    extracting one or more pseudo-SH-plate waves propagating in the first casing from the dispersion analysis; and
    identifying a bonding condition between the first casing and a cement using the one or more fluid modes, the one or more pseudo-lamb waves, or the one or more pseudo-SH-plate waves.

2. The method of claim 1, wherein the acoustic source is a monopole.

3. The method of claim 1, wherein the acoustic source is a dipole.

4. The method of claim 1, wherein the acoustic source is a unipole.

5. The method of claim 1, wherein the dispersion analysis is a matrix pencil, a prony, or a modified differential phase frequency semblance.

6. The method of claim 1, wherein the bonding condition is identified by minimizing between a model and the one or more fluid modes, the one or more pseudo-lamb waves, or the one or more pseudo-SH-plate waves.

7. The method of claim 1, wherein each of the one or more receivers are offset in relation to the acoustic source.

8. The method of claim 1, wherein the acoustic logging tool further comprises one or more acoustic sources.

9. The method of claim 8, further comprising transmitting one or more acoustic waves from the one or more acoustic sources sequentially, randomly, or simultaneously.

10. The method of claim 1, further comprising identifying a coupling between the one or more pseudo-lamb waves and the one or more fluid modes.

11. A method for cement evaluation, comprising:
    disposing an acoustic logging tool into a pipe string that is disposed in a first casing of a wellbore;
    transmitting an acoustic wave at a first location within the wellbore from an acoustic source disposed on the acoustic logging tool;
    recording one or more acoustic signals with one or more receivers on the acoustic logging tool at the first location;
    performing a multichannel multimode dispersion analysis of the one or more acoustic signals;
    identifying a target acoustic wave from the one or more acoustic signals, wherein the target acoustic wave comprises at least one or more fluid modes, one or more pseudo-lamb waves, or one or more pseudo-SH-plate waves propagating in the first casing from the dispersion analysis;
    extracting the target acoustic wave from the dispersion analysis; and
    identifying a bonding condition between the first casing and a cement using the target acoustic wave.

12. The method of claim 11, wherein identifying the target acoustic wave further comprises running a 2D Fourier transform to obtain a frequency-wavenumber spectrum.

13. The method of claim 12, wherein identifying the target acoustic wave further comprises enhancing the target acoustic wave in the frequency-wavenumber spectrum by applying a fan filter.

14. The method of claim 13, wherein identifying the target acoustic wave further comprises running a 2D inverse Fourier transform to obtain forms of the target acoustic wave.

15. The method of claim 11, wherein the acoustic source is a monopole.

16. The method of claim 11, wherein the acoustic source is a dipole.

17. The method of claim 11, wherein the acoustic source is a unipole.

18. The method of claim 11, wherein the target acoustic wave is one or more fluid modes, one or more pseudo-lamb waves, or one or more pseudo-SH-plate waves.

19. The method of claim 11, wherein the dispersion analysis is a matrix pencil, a prony, or a modified differential phase frequency semblance.

20. The method of claim 11, wherein the bonding condition is identified by minimizing between a model and one or more fluid modes, one or more pseudo-lamb waves, or one or more pseudo-SH-plate waves.

* * * * *